United States Patent [19]
Ellegaard

[11] Patent Number: 5,382,403
[45] Date of Patent: Jan. 17, 1995

[54] METHOD AND A SYSTEM FOR PRODUCING BLOCK BODIES FROM LOOSE MATERIAL SUCH AS SPHAGNUM

[76] Inventor: Øyvind Ellegaard, Højvangs Parkvej 34, DK-6700 Esbjerg, Denmark

[21] Appl. No.: 984,574
[22] PCT Filed: Sep. 3, 1991
[86] PCT No.: PCT/DK91/00255
 § 371 Date: May 14, 1993
 § 102(e) Date: May 14, 1993
[87] PCT Pub. No.: WO92/03914
 PCT Pub. Date: Mar. 19, 1992

[30] Foreign Application Priority Data
 Sep. 3, 1990 [DK] Denmark .................... 2110/90

[51] Int. Cl.⁶ .................................................. B29C 67/00
[52] U.S. Cl. .................................... 264/511; 264/512; 264/516; 264/517; 264/518; 425/80.1; 425/81.1; 425/83.1
[58] Field of Search .................... 264/511, 512, 516, 517, 264/518; 425/80.1, 81.1, 83.1

[56] References Cited
U.S. PATENT DOCUMENTS

| | | |
|---|---|---|
| 2,571,334 | 10/1951 | Browne .................... 425/80.1 |
| 3,147,165 | 9/1964 | Slayter .................... 425/83.1 |
| 3,341,890 | 9/1967 | Oja .................... 425/80.1 |
| 3,819,435 | 6/1974 | Roberts et al. .................... 156/62.2 |
| 4,674,966 | 6/1987 | Johnson et al. .................... 425/82.1 |
| 4,676,871 | 6/1987 | Cadieux et al. .................... 264/517 |
| 5,120,380 | 6/1992 | Strachan .................... 425/83.1 |

*Primary Examiner*—Mary Lynn Theisen
*Attorney, Agent, or Firm*—Antonelli, Terry, Stout & Kraus

[57] ABSTRACT

In the production of growth blocks of sphagnum there are considerable operational problems with the required compacting of the loose sphagnum, as both compaction worms and pistons may easily get stuck. Instead, the invention provides for the use of a suction technique, whereby the loose sphagnum (2) is sucked into a perforated pipe (34) in a suction chamber (28), whereby a marked compaction of the material is achievable without any use of mechanical devices. The compacted block material may be surrounded by a decomposable paper casing, which is laid in successively as a lining hose of air permeable paper. The compacted material can be delivered as a compact string (46) by successive projection movements of the suction chamber (28) for being cut into blocks (56), and the suction chamber can temporarily opened for free return movements into its initial position.

16 Claims, 2 Drawing Sheets

METHOD AND A SYSTEM FOR PRODUCING BLOCK BODIES FROM LOOSE MATERIAL SUCH AS SPHAGNUM

The present invention relates to a method of producing substrate blocks, primarily small blocks of sphagnum for the growing af cuttings and seed plants, and of the type consisting of a cylindrical block having an envelope of paper or a similar material and and an associated filling of sphagnum or a corresponding substrate material. Such blocks can be produced by extrusion of a substrate string that is introduced into a casing tube and cut into pieces of suitable length, and it is common practice that the cylindrical blocks thus produced are mounted in an e.g. vacuum shaped cutting tray of thin plastic, arranged with pockets for receiving the blocks, normally with the blocks somewhat upstanding from the top side of the tray. When the young plants have grown to a certain extent the substrate blocks are transferred to plant pots having a larger substrate volume, and the casing material is gradually decomposed, such that the plant can then freely grow its roots out in the plant pot.

It is already known that for the production of the substrate blocks it is possible to use machines operating roughly in the same manner as cigarette machines, but also being correspondingly very expensive, whereby they are entirely out of reach for even very large gardening enterprises or for only average sized special factories for the production of such blocks. There is an expressed need for cheaper machines for use in average sized enterprises, and here it has been customary to use a machinery operating by axially pressing the substrate material into the casing tube by means of either a conveying worm or a compaction piston.

Basically this is a simple technique, which can be applied with relatively very simple means, but for one thing the machinery is rather expensive anyway, and for another thing it is well known to the skilled people that there are noticeable operational difficulties with these machines, because a pressing forward and compaction of a loose sphagnum like material gives rise to big problems due to the coarse fibrous character of the material. With the use of both a piston and a worm there are frequent operational disturbances and stops, and the cheaper, yet still quite expensive machines in this group are thus largely problematic due to the coarse and sometimes even vary coarse structure of the substrate.

In connection with the present invention it has been realized that it is possible to effect an operationally much safer stowing together of the substrate material in the casing tube with the use of highly simple means, viz. by using suction in stead of pressing. The casing tube may well be made of air permeable material, this even applying to a here well usable material which has in fact already been used as a casing material, without, however, the said property of the material having been paid particular attention or utilized in connection with the filling in of the substrate. The casing tube can be advanced through a vacuum zone, in which air is sucked in or rather out with such a capacity that the suction can be brought to propagate axially through a feeder conduit in a manner such that the material may be supplied by suction in from a storage of loose substrate material, while in the suction chamber it will be packed together with a force depending of the applied vacuum. This provides for operational conditions quite different from those associated with pressing means, as there will be no risk of any jamming. The compaction of the material will take place successively from the suction end of the suction zone, and it has been found that the operational safety can hereby be extremely high.

Once the block material has been built up in the suction zone the filled paper tube may be further advanced by mechanical means, whereby blocks of a suitable length can be currently cut from the advanced material string, and these blocks may then be transferred for automatic mounting in receiver units such as cutting trays.

The invention, which is further defined in the appended claims and also comprises a system for carrying out the method, will now be described in more detail with reference to the drawing, in which:

Figure 1:
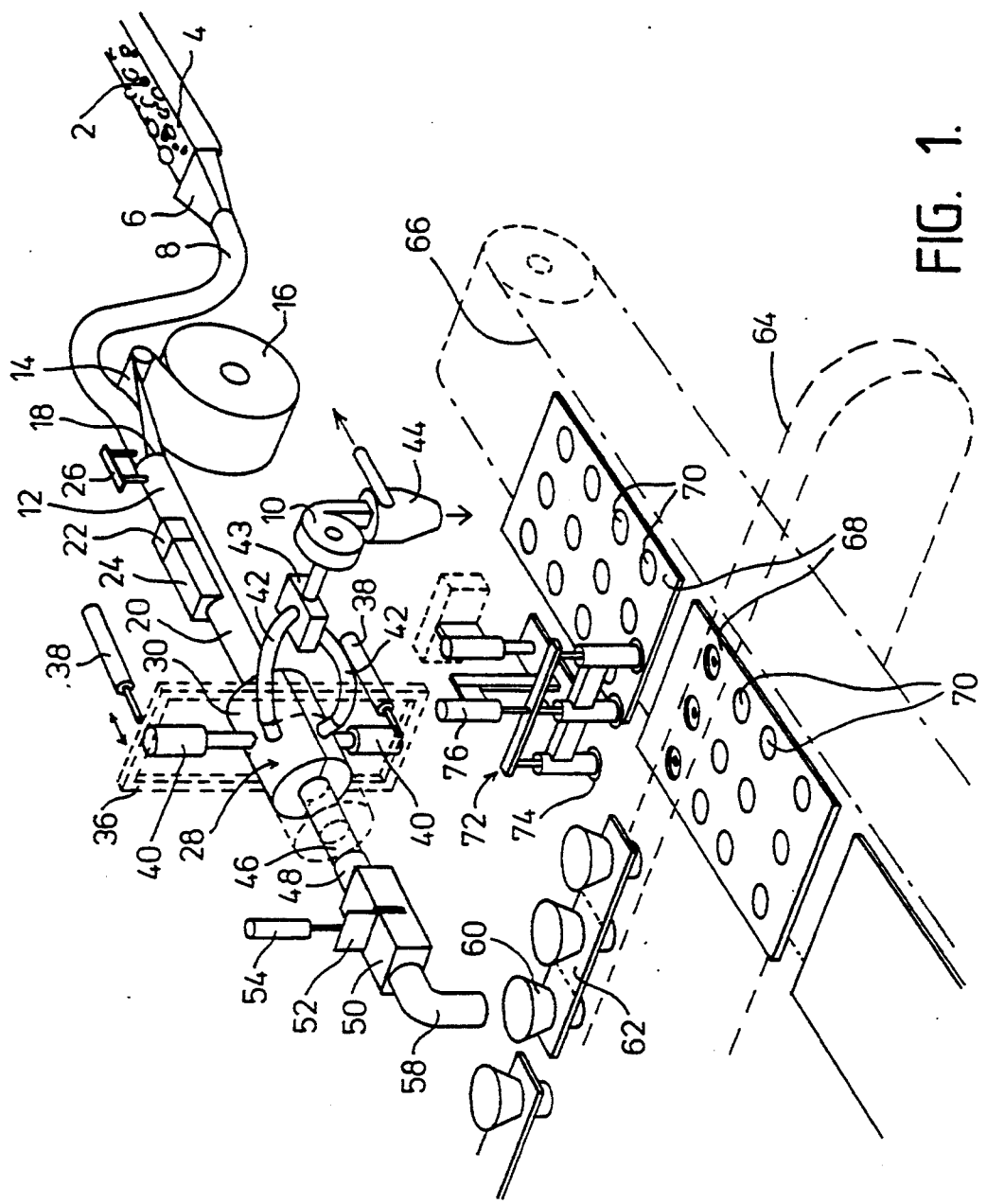
FIG. 1 is a schematic perspective view of a system according to the invention.

In the right hand side of FIG. 1 is shown an amount of sphagnum 2 supplied on a conveyor belt 4 forwardly towards the end of a suction funnel 6, which projects from a conveyor pipe 8, optionally in a crosswise movable manner, such that by control means not shown it can be displaced for currently sucking away the arriving sphagnum by the action of a suction blower 10 connected with the pipe 8 further ahead thereof. It is not decisive how the sphagnum is supplied to the suction pipe 8, when only there is arranged for a preferably continuous sucking in.

The pipe extends further through a folding zone 12, in which an air permeable paper strip 14 supplied from a storage reel 16 is successively wrapped about the pipe and continues into the pipe through a narrow annular slot 18 so as to form an inner lining hose in the further projecting pipe, designated 20. In a gluing station 22 glue is applied to a joining edge area of this hose, and the glue is set by the hose passing through a heating station 24, such that thereafter the paper web is stabilized in its hose shape for further advancing inside the pipe 20.

Figure 3:
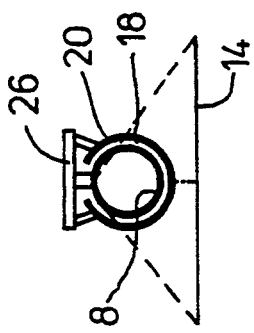
FIG. 3 is an end view of a paper inlet station.

The introduction of the paper web 14 is also illustrated in FIG. 3, where it is shown that the pipes 8 and 20 meet so as to form the annular slot 18, holding means 26 being arranged for mutually centered fixing of the pipes in this area.

Figure 2:
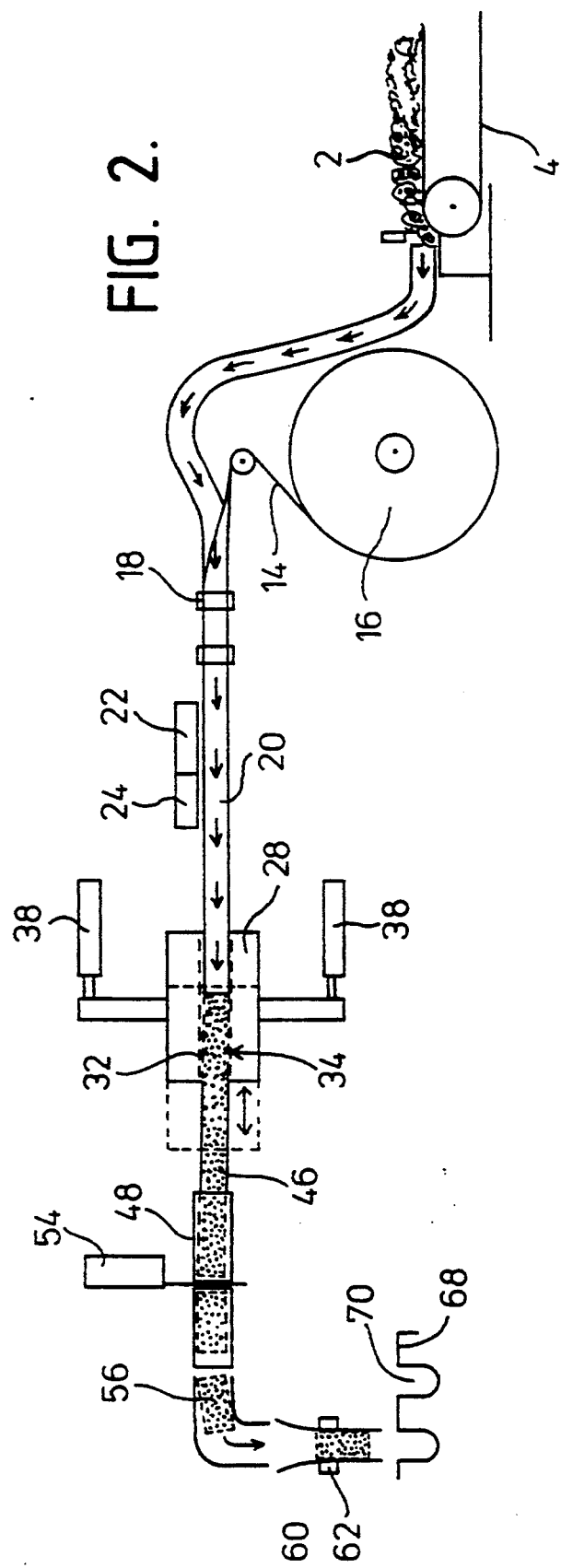
FIG. 2 is a lateral view thereof.

Thereafter the pipe 20 continues further into a suction chamber 28 designed as a cylindrical housing consisting of two mutually separable half parts having a outer shell 30 and an internal tube or half tube shell 32, these shells 32 in the joined condition of the two half parts forming a perforated tube 34 extending as a prolongation of the pipe 20, though with a slightly larger diameter. As shown in FIG. 2 the pipe 20 is intruding into a part of the perforated tube 34, with light slide fit therein.

The suction chamber is suspended in a surrounding frame 36 and is, together with this frame, axially reciprocal by means of suitable driving means such as cylinders 38. The connection between the frame 36 and the suction chamber is established through opposite working cylinders 40 cooperating with the respective halves of the suction chamber, such that these can additionally be controlled to move away from each other, as indicated by dotted lines in FIG. 4.

The suction chamber 28 or rather the two halves thereof are connected, through flexible hoses 42, with the suction side of the said suction blower 10, the outlet or pressure side of which is connected with a separator cyclone 44.

As further mentioned below, a rigid material rod or string 46 will be formed in the suction chamber 28 and brought forwardly to a receiver tube 48, which continues into a cutting box 50, in which a knife 52 controlled by a cylinder 54 will successively cut the material string for forming it into block bodies 56, FIG. 2. These bodies are conveyed through a funnel member 58 for being received in suitable receptacles, a preferred design of which will be indicated below.

In an initial start phase the paper web 14 is introduced through the annular slot 18 and is 'fished' forwardly to the left end of the suction chamber 28, FIGS. 1 and 2. This end is temporarily closed, whereby the suction blower 10 will suck in air through the hoses 42, the wall of the perforated inner tube 34, the wall of the tubular portion of air permeable paper located thereagainst, the interior of the pipe 20 and its continuation 8 in front of the annular slot 18, and finally (or rather in the first place) through the outer suction funnel 6. The supplied sphagnum 2 will thus be sucked forwardly for being deposited in the suction chamber 28, where the sphagnum is positively compacted at the left hand end and therefrom further to the right. Hereby a rigid string 46 of paper wrapped, compacted sphagnum will be built up.

After this initial starting phase the cylinders 38 are actuated for pushing the suction chamber 28 towards the cutting box 50, whereby the suction chamber, bringing along the sphagnum string as compacted therein, causes this string to be introduced into the inlet tube 48 on the cutting box 50, while also causing the surrounding paper casing to be advanced and thus also the paper web 14 to be drawn forwardly and into the pipe 20 through the annular slot 18.

Figure 4:
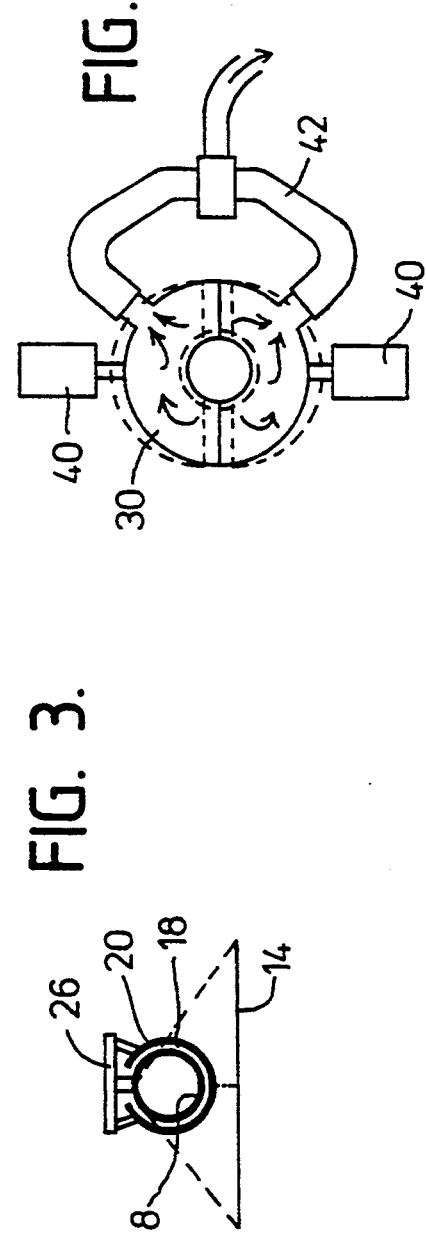
FIG. 4 is an end view of a suction chamber in the system.

Thereafter the cylinders 40 are actuated to draw the half parts of the suction chamber from each other, i.e. to the positions shown in dotted lines in FIG. 4, in which the inner, perforated tube portions 32 fully leave their engagement with the formed string 46, and then the cylinders 36 are actuated for returning the thus separated half parts of the suction chamber into their initial positions, in which they are again brought together by means of the cylinders 40. Now the compacted material string 46 as emerging from the left hand end of the suction chamber will form a practically airtight plug against air being sucked in from this end of the suction chamber, such that thereafter the said temporary closing of this end will no longer be required. New material 2 will be sucked in for compaction in immediate continuation of the string portion 46 which has already been projected from the suction chamber 28, and it will be appreciated that in this manner, by successive movements of the half parts of the suction chamber, it is possible to achieve a stepwise projection of the paper wrapped material string 46 to the cutting unit 50.

The material is introduced at the right hand end of the perforated tube 36 of the suction chamber as the tube 36 is moved forwardly over the end of the pipe 20, and this movement is to be stopped just before the suction chamber would hereby leave this pipe end, confer the suction chamber position shown in dotted lines in FIG. 2. The suction chamber should not be opened until the material has been compacted all over the length of the chamber and a short distance into the mouthing of the pipe 20, viz. such that the material string 46 will be self carrying between the mouthings of the pipes 20 and 48 when the suction chamber is opened for its return movement; it could be a possibility, however, that the string should not be fully self-carrying, as the lower half part of the suction chamber could be left unlowered by the returning of the suction chamber.

It is a theoretical possibility that the suction chamber could be left unopened or unseparated, such that it should not have to be movable or divided in separate halves, viz. if the conveying of the material string 46 is effected by separate means in front of the front end of the suction chamber, e.g. by driving means including toothed wheels, the teeth of which intrude directly into the side of the string 46; it will not be very important if the paper casing is hereby widely damaged, but it has been found that it is difficult in this manner to achieve a well defined conveyance of the string 46, because of a pronounced friction between this string and the inner side of the perforated tube 36. It is this friction which is utilized for the already described, preferred conveying method.

With reference to the above it can be of importance to determine when the perforated tube 36 has been entirely filled out by compacted material. This may be determined iteratively, but also with the use of a sub pressure gauge connected to the suction connection between the suction blower 10 and the suction chamber 28; the applied sub pressure will rise noticeably when the material has been compacted to such an extent that the further sucking in of air is blocked essentially.

In principle, the delivery of the cut block members 56 may take place directly to respective receiver openings in receiving trays which are displaced stepwise and laterally in front of the cutting unit 50, but in practice this has been found less attractive. In stead it is preferred, as shown in FIG. 1, to drop the cut block members 56 through the spout portion 58 such that they fall down into funnel members 60 carried by supporting means 62 conveyed chainlike along a path 64 crossing over a longitudinally extending conveyor 66, which carries along the said receiver trays 68 having receiving pockets 70. Above the conveying path of the supporting means 62 there is provided a push-down station 72 with pusher pistons 74, which, by means of a working cylinder 76, are operable to push down the block members 56 into the respective receiver pockets 70 in the underlying trays 68 as conveyed on the conveyor 66. The push-down pistons 74 are able to surpass the pressure necessary for pressing the block members 56 downwardly out of the funnel members 60.

In the cutting station 12 the effective cutting means may be a circular saw, but in practice it will be preferred to make use of more adjacent, parallel process lines for concurrently filling substrate blocks into more tray pockets, and if so it will be suitable to use a rapidly reciprocal saw blade, which can cut more substrate strings at a time by a unitary cross feed of the saw blade.

The compactness of the formed block substrate is highly depending of the applied suction pressure, and it can be suitable to make use of a pressure regulator 43, either for a production of blocks having a varying density or for adjusting the density when the quality of the raw material varies.

For successful tests of the principles of the invention an ordinary household vacuum cleaner has been used in connection with a 40 mm suction pipe, i.e. it has proved sufficient to use a simple suction blower as distinguished from a real vacuum pump. Of course, several production strings would be serviceable from a common suction blower.

The building up of the block string af sphagnum or other substrate material may of course take place also without any preceding introduction of the air permeable web and casing material, though in that case the tube 34 in the suction chamber 28 should be finely perforated, and in some cases it is acceptable to deliver the string or block material without the surrounding envelope. Alternatively a casing material may be applied in connection with the block string leaving the tube after the chamber 28.

It is a further possibility that the chamber 28 and its downstream tube outlet can be arranged with a certain directional break from the direction of the preceding feeding pipe, whereby it would be possible to use a piston in connection with an external working cylinder for pressing out the material from the chamber region, without the latter being opened.

It should be mentioned that the technique according to the invention may well be used for similar block formation of materials other than sphagnum, also for other purposes.

I claim:

1. A method of manufacturing compacted substrate material from a loose material comprising:
   suctioning the loose material through a pipe into a suction chamber for deposition and compaction into the compacted substrate material within the suction chamber by suction applied through a perforated tube in the suction chamber to the loose material; and
   conveying the compacted substrate material from the suction chamber.

2. A method according to claim 1 further comprising:
   forming a plug of the compacted substrate material in an outlet conduit of the suction chamber as part of compacting the material within the suction chamber.

3. A method according to claim 1 further comprising:
   introducing an air permeable web through an aperture in the pipe;
   forming a lining from the web in an end portion of the pipe adjacent the suction chamber; and
   conveying the lining containing the compacted substrate material from the suction chamber by gripping the lining and moving the gripped lining.

4. A method according to claim 3 further comprising:
   moving the suction chamber in a forward direction with separable parts of the suction chamber joined together to hold the lining containing the compacted substrate material during movement in the forward direction; and
   moving the suction chamber with the parts separated in a rearward direction back to a starting position of the forward movement to position the suction chamber for a repeat of the forward movement of the lining containing the compacted substrate material.

5. A system for manufacturing compacted substrate material from loose material comprising:
   a pipe for suctioning the loose material from a loose material source to a perforated tube within a suction chamber surrounding a part of the pipe;
   a suction source coupled to the suction chamber through the perforated tube for applying suction to the loose material; and
   a mechanism for discharging the compacted substrate material from the suction chamber.

6. A system according to claim 5 wherein the mechanism for discharging comprises:
   the suction chamber having separable parts;
   a mechanism for axially reciprocating the suction chamber in a forward direction to move the compacted substrate material in the forward direction while the parts are closed and in a rearward direction while the parts are open to reposition the parts to close on the compacted substrate material; and
   a mechanism for opening and closing the parts.

7. A system according to claim 5 wherein:
   the pipe has an aperture into which an air permeable web is introduced; and
   a mechanism to form the web into an axially movable lining within the pipe for containing the compacted material inside the lining.

8. A system according to claim 5 wherein:
   a suction pressure regulator is provided between the suction source and the suction chamber.

9. A method of manufacturing compacted sphagnum from a loose sphagnum comprising:
   suctioning the loose sphagnum through a pipe into a suction chamber for deposition and compaction into the compacted sphagnum within the suction chamber by suction applied through a perforated tube in the suction chamber to the loose sphagnum; and
   conveying the compacted sphagnum from the suction chamber.

10. A method according to claim 9 further comprising:
    forming a plug of the compacted sphagnum in an outlet conduit of the suction chamber as part of compacting the sphagnum within the suction chamber.

11. A method according to claim 9 further comprising:
    introducing an air permeable web through an aperture in the pipe;
    forming a lining from the web in an end portion of the pipe adjacent the suction chamber; and
    conveying the lining containing the compacted sphagnum from the suction chamber by gripping the lining and moving the gripped lining.

12. A method according to claim 11 further comprising:
    moving the suction chamber in a forward direction with separable parts of the suction chamber joined together to hold the lining containing the compacted sphagnum during movement in the forward direction; and
    moving the suction chamber with the parts separated in a rearward direction back to a starting position of the forward movement to position the suction chamber for a repeat of the forward movement of the lining containing the compacted sphagnum.

13. A system for manufacturing compacted sphagnum from loose sphagnum comprising:
    a pipe for suctioning the loose sphagnum from a loose sphagnum source to a perforated tube within a suction chamber surrounding a part of the pipe;

a suction source coupled to the suction chamber through the perforated tube for applying suction to the loose sphagnum; and a mechanism for discharging the compacted substrate material from the suction chamber.

14. A system according to claim 13 wherein the mechanism for discharging comprises:

the suction chamber having separable parts;

a mechanism for axially reciprocating the suction chamber in a forward direction to move the compacted sphagnum in the forward direction while the parts are closed and in a rearward direction while the parts are open to reposition the parts to close on the compacted sphagnum; and a mechanism for opening and closing the parts.

15. A system according to claim 13 wherein:

the pipe has an aperture into which an air permeable web is introduced; and a mechanism to form the web into an axially movable lining within the pipe for containing the compacted sphagnum inside the lining.

16. A system according to claim 13 wherein:

a suction pressure regulator is provided between the suction source and the suction chamber.

* * * * *